(12) United States Patent
Das et al.

(10) Patent No.: US 10,471,938 B2
(45) Date of Patent: Nov. 12, 2019

(54) METHOD AND SYSTEM FOR CONTROL OF MOTOR VEHICLE LONGITUDINAL MOVEMENT

(71) Applicant: Ford Global Technologies, LLC, Dearborn, MI (US)

(72) Inventors: Ashrit Das, Cologne (DE); Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/456,797

(22) Filed: Mar. 13, 2017

(65) Prior Publication Data
US 2017/0259795 A1    Sep. 14, 2017

(30) Foreign Application Priority Data
Mar. 14, 2016    (DE) .......................... 10 2016 204 136

(51) Int. Cl.
*B60T 8/1755*    (2006.01)
*B60G 17/016*    (2006.01)
*B60G 17/0195*    (2006.01)

(52) U.S. Cl.
CPC ........ *B60T 8/1755* (2013.01); *B60G 17/0161* (2013.01); *B60G 17/0164* (2013.01); *B60T 8/17558* (2013.01); *B60G 17/0195* (2013.01); *B60G 2800/01* (2013.01); *B60G 2800/014* (2013.01); *B60T 2230/04* (2013.01)

(58) Field of Classification Search
CPC ............... B60T 8/1755; B60T 8/17558; B60T 2230/04; B60G 17/0161; B60G 17/0164; B60G 17/0195; B60G 2800/01; B60G 2800/014
See application file for complete search history.

(56) References Cited

U.S. PATENT DOCUMENTS

| 6,273,204 B1 * | 8/2001 | Winner .............. B60K 31/0008 180/170 |
| 8,190,347 B2 | 5/2012 | Nakai et al. |
| 9,358,962 B2 | 6/2016 | Zambou |

(Continued)

FOREIGN PATENT DOCUMENTS

DE    102006034411 A1    1/2006

*Primary Examiner* — Courtney D Heinle
(74) *Attorney, Agent, or Firm* — Raymond L. Coppiellie; Burgess Law Office, PLLC

(57) ABSTRACT

A method for the automated control of the longitudinal movement of a motor vehicle having an automated positive acceleration process in a longitudinal direction of the vehicle and an automated deceleration in the longitudinal direction of the vehicle. An acceleration variable is determined based on a jerk value and limited in terms of absolute value. And the jerk value is in turn determined in a driving mode in which, starting from a vehicle actual longitudinal speed and a vehicle actual longitudinal acceleration, the motor vehicle is adjusted to a predeterminable vehicle longitudinal speed taking into account a predeterminable maximum positive driving mode vehicle longitudinal acceleration, a predeterminable maximum driving mode vehicle longitudinal deceleration and at least one predeterminable driving operating mode jerk absolute value which limits the jerk.

5 Claims, 3 Drawing Sheets

(56) References Cited

U.S. PATENT DOCUMENTS

| | | | | |
|---|---|---|---|---|
| 2001/0032048 | A1* | 10/2001 | Hellmann | B60K 31/0008 |
| | | | | 701/96 |
| 2002/0143457 | A1* | 10/2002 | Hellmann | B60K 31/04 |
| | | | | 701/93 |
| 2007/0192009 | A1* | 8/2007 | Braeuchle | B60T 7/22 |
| | | | | 701/70 |
| 2009/0043466 | A1* | 2/2009 | Nakai | B60W 30/188 |
| | | | | 701/55 |
| 2010/0009807 | A1* | 1/2010 | Umakoshi | B60T 13/662 |
| | | | | 477/73 |
| 2010/0185375 | A1* | 7/2010 | Hanzawa | B60T 8/174 |
| | | | | 701/70 |
| 2012/0130612 | A1* | 5/2012 | Watanabe | B60T 8/17554 |
| | | | | 701/70 |
| 2014/0180554 | A1* | 6/2014 | Takahashi | B60W 30/143 |
| | | | | 701/70 |
| 2014/0277990 | A1* | 9/2014 | Zambou | B60K 31/0008 |
| | | | | 701/96 |
| 2015/0175160 | A1* | 6/2015 | Sudou | B60W 30/09 |
| | | | | 701/70 |
| 2018/0134291 | A1* | 5/2018 | Burford | B60W 30/143 |

* cited by examiner

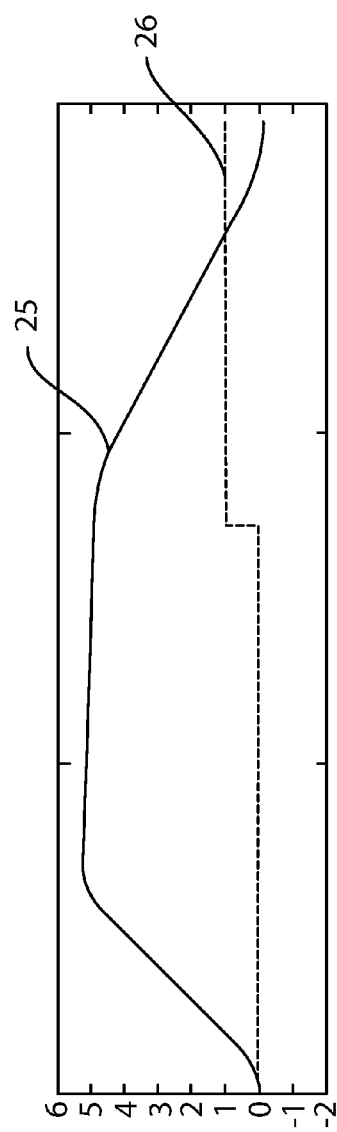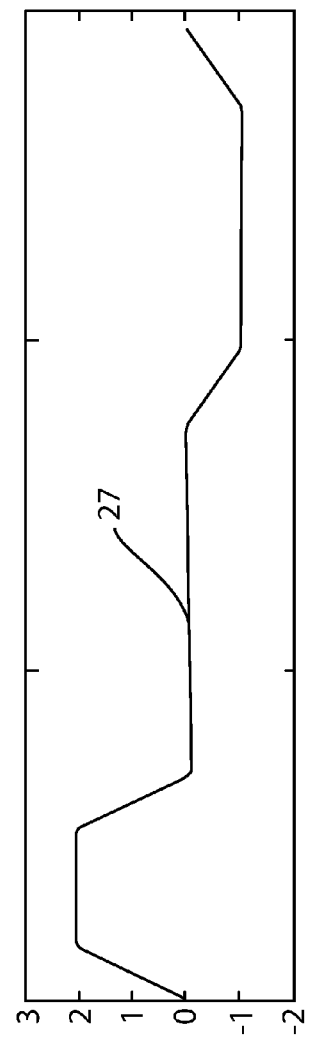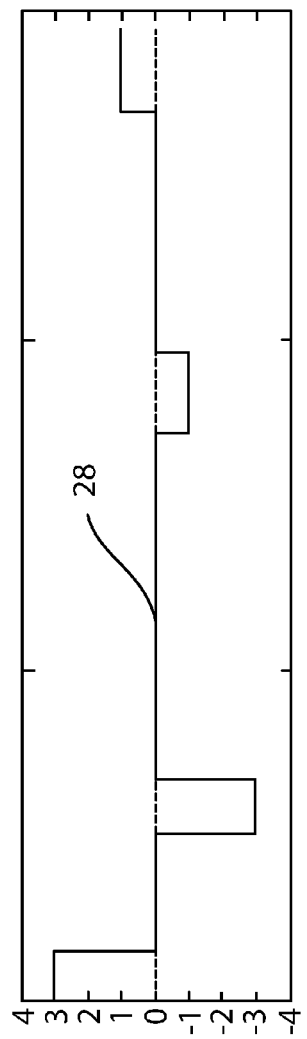
FIG. 2a
FIG. 2b
FIG. 2c

METHOD AND SYSTEM FOR CONTROL OF MOTOR VEHICLE LONGITUDINAL MOVEMENT

CROSS-REFERENCE TO RELATED APPLICATIONS

Not Applicable.

BACKGROUND OF THE INVENTION

1. Field of the Invention

The present invention relates to a method and system for automated control of motor vehicle longitudinal movement.

2. Description of Related Art

Automated control of motor vehicle longitudinal movement typically means accelerating the motor vehicle in an automated fashion in a vehicle longitudinal direction using a drive train of the motor vehicle, for example at an internal combustion engine, or electric motor, and of decelerating it in an automated fashion in the longitudinal direction of the vehicle, using the drive train, or a brake system of the motor vehicle. The acceleration or deceleration being a function of an acceleration variable representing a vehicle setpoint longitudinal acceleration. The term positive acceleration of the vehicle meaning that acceleration takes place in a forward-directed direction of travel. With an acceleration that takes place counter to the forward direction of travel, in the reverse direction of travel, referred to as a negative acceleration or deceleration. Acceleration generally comprises both a positive and a negative acceleration.

Precise longitudinal movement control provides safety and comfort in an autonomously driven vehicle. Currently available commercial comfort systems, for example, adaptive cruise control systems, and under certain circumstances vehicles with a "Stop & Go" function or autonomous parking, are generally assisted by a longitudinal movement controller that accelerates a vehicle within a predefined distance and operates to maintain vehicle speed and stop the vehicle gently.

Controlling longitudinal movement based solely on setpoint value generation of the vehicle longitudinal speed, and during which the vehicle longitudinal speed is reduced to zero as the distance from a predeterminable destination decreases, may not provide a satisfactory result. In terms of a comfortable, essentially jerk-free longitudinal movement of the motor vehicle, the setpoint value generation of the vehicle longitudinal speed, which is based on the distance from the destination, does not adequately take into account the dynamics of the system. Likewise, a longitudinal speed control that is carried out within tight limits on allowable velocity error gives rise to a jerking longitudinal movement of the vehicle, which is perceived as disruptive or at least uncomfortable by the occupants of the vehicle.

Industrial robot controllers use existing methods for jerk limited trajectory planning require considerable computational expenditure, since their algorithms are based on an iterative or recursive calculation. This category includes, for example, the method for jerk-limited trajectory planning which is disclosed in the scientific article "On-Line Planning of Time-Optimal, Jerk-Limited Trajectories" written by Robert Haschke, Erik Weitnauer and Helge Ritter and published at the International Conference on Intelligent Robots and Systems (IROS) 2008.

SUMMARY OF THE INVENTION

A method and system for controlling motor vehicle longitudinal movement having a drive train and a brake system. A controller monitors actual vehicle longitudinal speed and actual vehicle longitudinal acceleration. The controller determining a jerk value based on the actual vehicle longitudinal speed and the actual vehicle longitudinal acceleration. Using the jerk value and sending a signal to the drive train of the motor vehicle to adjust the motor vehicle to a predeterminable vehicle longitudinal speed based on a predeterminable maximum positive vehicle longitudinal acceleration, a predeterminable maximum vehicle longitudinal deceleration and at least one predeterminable jerk absolute value that limits the jerk value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2a is a longitudinal speed/time diagram according to the method of FIG. 1.

FIG. 2b is a longitudinal acceleration/time diagram according to the method of FIG. 1.

FIG. 2c is a jerk/time diagram according to the method of FIG. 1.

DETAILED DESCRIPTION OF THE PREFERRED EMBODIMENTS

The following description of the preferred embodiment(s) is merely exemplary in nature and is in no way intended to limit the invention, its application, or uses.

In the different figures, equivalent parts are always provided with the same reference symbols, wherein they are generally described only once.

As set forth herein, the present invention is a method and device for controlling the longitudinal movement of a motor vehicle, which can accelerate the motor vehicle in the longitudinal direction in an automated fashion, maintain the speed, and gently stop the motor vehicle over a predeterminable distance, all the movement processes of the motor vehicle being essentially jerk limited, carried out essentially with a jerk that is not perceived as harsh by an occupant of the motor vehicle, and therefore comfortably. Furthermore, the method requires comparatively low computational expenditure for its execution.

Figure 1:
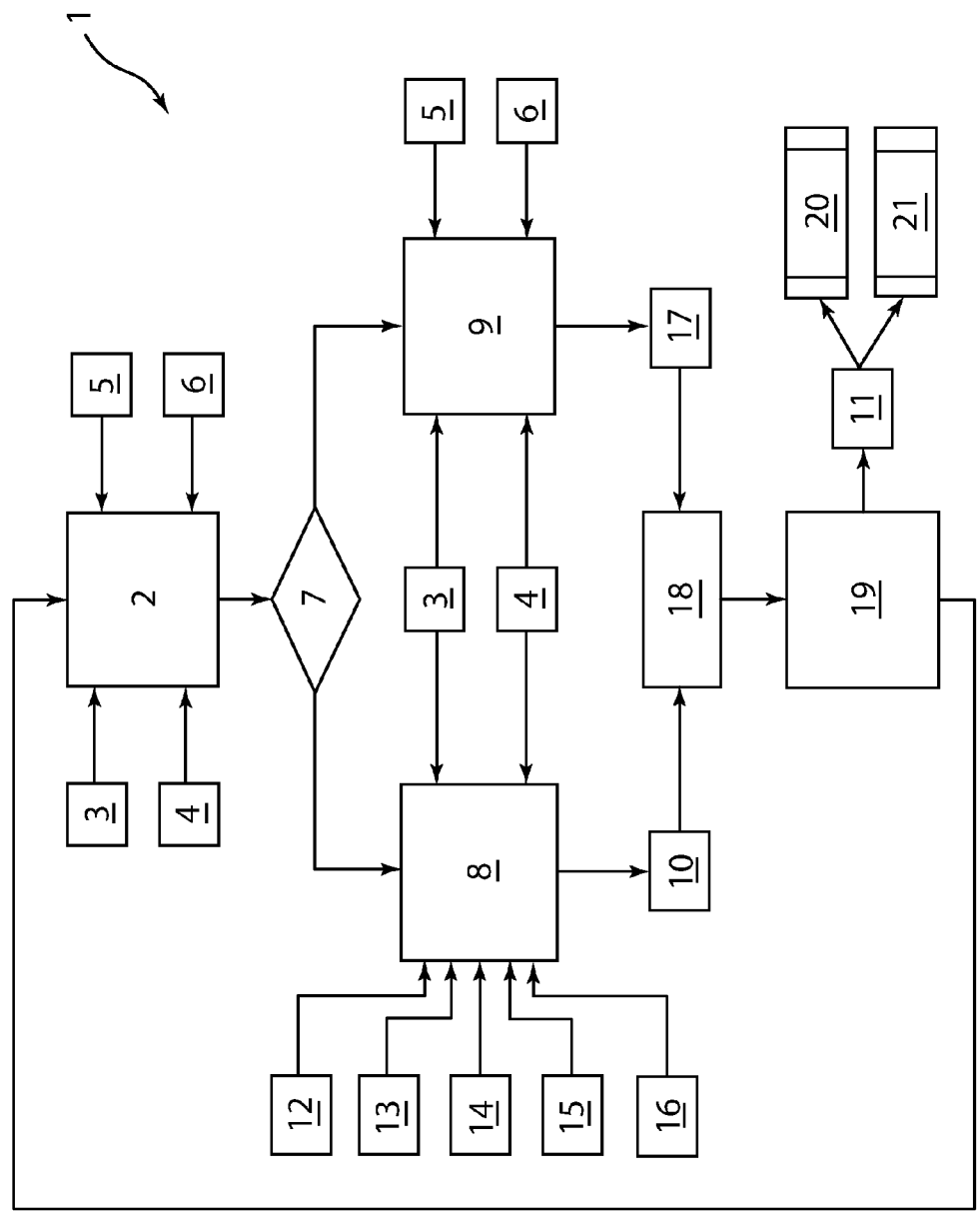
FIG. 1 is a flowchart of a method according to the invention according to an exemplary embodiment.

FIG. 1 illustrates a flowchart of a method 1 according to an exemplary embodiment of the invention for the automated control of the longitudinal movement of a motor vehicle. The method 1, as shown in step 2, determines a braking distance of the motor vehicle, the distance that the motor vehicle can be gently and comfortably braked to a stationary state starting from a vehicle actual longitudinal speed 3 and a vehicle actual longitudinal acceleration 4, taking into account a predeterminable maximum deceleration value for vehicle longitudinal deceleration 5 in deceleration mode and a predeterminable deceleration mode jerk absolute value 6. The vehicle longitudinal acceleration 4 includes both actual acceleration and deceleration, wherein acceleration is the rate of change of velocity per unit of time.

Step 7 determines whether a predeterminable free distance, i.e., the distance still to be traveled by the motor vehicle, is longer than the braking distance determined in step 2. If so, a driving mode 8 controls longitudinal movement control of the motor vehicle. If not, a deceleration mode 9 controls the longitudinal movement control of the motor vehicle.

In the driving mode 8, a driving mode jerk value 10, representing a change over time in acceleration 11 is determined, the acceleration 11 representing a vehicle setpoint longitudinal acceleration that subsequently gently and comfortably accelerates, either positively or negatively, the motor vehicle. The driving mode jerk value 10 determined, in the exemplary embodiment, based on the driving mode 8, in such a way that the motor vehicle can be adjusted gently and comfortably to a predeterminable vehicle longitudinal speed 16 starting from the vehicle actual longitudinal speed 3 and the vehicle actual longitudinal acceleration 4 taking into account a predeterminable maximum positive driving mode vehicle longitudinal acceleration 12, a predeterminable maximum driving mode vehicle longitudinal deceleration 13 and two predeterminable driving mode jerk absolute values 14, 15 which limit the driving mode jerk value 10.

In the exemplary embodiment illustrated in FIG. 1, the predeterminable maximum positive driving mode vehicle longitudinal acceleration 12 and the predeterminable maximum driving mode vehicle longitudinal deceleration 13 are fed to the driving mode 8. The maximum positive driving mode vehicle longitudinal acceleration 12 is the acceleration that the motor vehicle can be positively accelerated insofar as the vehicle actual longitudinal speed 3 lies below the predeterminable vehicle longitudinal speed 16. The predeterminable maximum driving mode vehicle longitudinal deceleration 13 is the acceleration that the motor vehicle can be decelerated insofar as the vehicle actual longitudinal speed 3 lies above the predeterminable vehicle longitudinal speed 16.

In the exemplary embodiment illustrated in FIG. 1 two predeterminable jerk absolute values 14, 15, each different in terms of absolute value, are also fed to the driving mode 8. These jerk absolute values 14, 15 serve, depending on the absolute value of the deviations of the vehicle actual longitudinal deceleration 4 and/or of the vehicle actual longitudinal speed 3 from the predeterminable vehicle longitudinal accelerations 12, 13 or the predeterminable vehicle longitudinal speed 16, to determine a jerk value 10 of the driving mode 8 that is different in terms of absolute value, to be able to adapt the vehicle longitudinal speed quickly to the predeterminable vehicle longitudinal speed 16.

Furthermore, as illustrated in FIG. 1, tolerance ranges, for example vehicle longitudinal acceleration tolerance range or vehicle longitudinal deceleration tolerance range predetermined about each value of the predeterminable vehicle longitudinal accelerations 12, 13, are determined. Furthermore, a predeterminable tolerance range or zero vehicle longitudinal acceleration tolerance range is also determined about a zero vehicle longitudinal acceleration whose value represents zero (0). The tolerance ranges are all of equal width and do not overlap. Therefore, a total of seven acceleration zones for the vehicle actual longitudinal acceleration 4 are produced. The vehicle actual longitudinal acceleration 4 can be above the vehicle longitudinal acceleration tolerance range, acceleration zone 1, defined about the maximum positive driving mode vehicle longitudinal acceleration 12. The vehicle actual longitudinal acceleration 4 can be within the vehicle longitudinal acceleration tolerance range, acceleration zone 2. The vehicle actual longitudinal acceleration 4 can be below the vehicle longitudinal acceleration tolerance range and above the zero vehicle longitudinal acceleration tolerance range, acceleration zone 3, defined about the zero vehicle longitudinal acceleration. The zero vehicle longitudinal acceleration represents the value zero (0) of the vehicle longitudinal acceleration. The vehicle actual longitudinal acceleration 4 can be within the zero vehicle longitudinal acceleration tolerance range, acceleration zone 4. The vehicle actual longitudinal acceleration 4 can be below the zero vehicle longitudinal acceleration tolerance range and above the vehicle longitudinal deceleration tolerance range, acceleration zone 5, which is defined about the predeterminable maximum driving mode vehicle longitudinal deceleration 13. The vehicle actual longitudinal acceleration 4 can be within the vehicle longitudinal deceleration tolerance range, acceleration zone 6. The vehicle actual longitudinal acceleration 4 can be below the vehicle longitudinal deceleration tolerance range, acceleration zone 7.

A predeterminable tolerance range or speed tolerance range is also determined relative to the predeterminable vehicle longitudinal speed 16. The vehicle actual longitudinal speed 3 can be above the speed tolerance range, speed zone 1, defined about the predeterminable vehicle longitudinal speed 16. The vehicle actual longitudinal speed 3 can be within the speed tolerance range, speed zone 2, and the vehicle actual longitudinal speed 3 can be below the speed tolerance range, speed zone 3.

Therefore, the definition of the jerk value 10 in the driving mode 8 simultaneously takes into account the seven acceleration zones and the three speed zones set forth above, wherein there are a resulting seven times three or twenty-one possible acceleration speed combinations, for which the method 1 illustrated in FIG. 1 respectively determines separately the jerk value 10 taking into account the two predeterminable driving mode jerk absolute values 14, 15 that limit the jerk value 10 to achieve optimum adjustment of the longitudinal speed of the motor vehicle to the predeterminable vehicle longitudinal speed 16.

In the deceleration mode 9, a deceleration mode jerk value 17 that represents a change over time in the acceleration variable 11 is determined. The change over time in the acceleration variable 11 in turn representing a vehicle setpoint longitudinal acceleration with which the motor vehicle is subsequently decelerated gently and comfortably. The jerk value 17 in the deceleration operating mode 9 is such that the motor vehicle can be, starting from the vehicle actual longitudinal speed 3 and the vehicle actual longitudinal acceleration 4, decelerated gently and comfortably to the stationary state within the predeterminable distance taking into account the predeterminable maximum deceleration mode vehicle longitudinal deceleration 5 and the predeterminable deceleration mode jerk absolute value 6 which limits the jerk value 17.

For this purpose, the jerk value 17, in the deceleration mode 9 of the exemplary embodiment of method 1 illustrated in FIG. 1, is a function of four deceleration time periods. The first time period represents a duration for change of acceleration from the positive vehicle actual longitudinal acceleration 4 to a zero vehicle longitudinal acceleration, a vehicle longitudinal acceleration with the value zero (0). The second time period represents a duration for reaching a maximum vehicle longitudinal deceleration, a vehicle longitudinal acceleration with a negative value, wherein the vehicle longitudinal acceleration corresponds either to the predeterminable maximum deceleration mode vehicle longitudinal deceleration 5 or is a vehicle longitudinal deceleration the is lower in terms of absolute value, if the predeterminable maximum deceleration mode vehicle longitudinal deceleration 5 does not have to be reached at all in the second time period in order to brake the vehicle to the stationary state within the predeterminable distance. The third time period represents a duration during which the predeterminable maximum deceleration mode vehicle longitudinal deceleration 5 is kept constant insofar as this is reached in the second time period. The fourth time period represents a duration for ending the deceleration starting from the maximum vehicle longitudinal deceleration which is achieved in the second time period. The jerk value 17 based on the first time period from first to fourth that is non zero.

The deceleration mode 9 calculates a trapezoidal or a wedge-shaped profile for the vehicle longitudinal deceleration which is necessary during the stopping process of the motor vehicle within the predeterminable distance on the basis of the vehicle longitudinal deceleration and in turn the jerk value 17 set forth above. The trapezoidal or wedge-shaped profile of the vehicle longitudinal deceleration results in a deceleration trajectory of the motor vehicle that is easy to calculate, it can be calculated non-iteratively and non-recursively, and describes the deceleration distance of the motor vehicle for gentle and comfortable stopping of the motor vehicle starting from the vehicle actual longitudinal speed 3, the vehicle actual longitudinal deceleration 4, and taking into account the predeterminable maximum deceleration mode vehicle longitudinal deceleration 5 and the predeterminable jerk absolute value 6 that limits the jerk value 17.

The jerk value 10, 17 is determined on the basis of the driving mode 8 or the deceleration mode 9 and the acceleration variable 11, vehicle setpoint longitudinal acceleration, in turn is determined from the jerk value 10, 17. Before determination of the acceleration variable 11 from the jerk value 10, 17 in step 8 or step 9, the jerk value 10, 17 is subjected, in the exemplary embodiment, to a low-passing filtering 18 to smooth discontinuities in the profile of the jerk value 10, 17 on the basis of jumps in value and makes transitions in the profile of the acceleration variable 11 take place gently and softly at the sudden points of change in the jerk value 10, 17. In the case of the method 1 illustrated in FIG. 1, the low-pass filtering 18 takes place based on averaging of the jerk value 10, 17 over a time period of approximately 100 ms.

Subsequently in step 19 the acceleration variable 11, vehicle setpoint longitudinal acceleration, is determined, for example, by integration of the previously determined jerk value 10, 17 over time. On the basis of the determined acceleration variable 11, an automated, positive acceleration process is then brought about in the longitudinal direction of the vehicle by an actuating intervention at a drive train 20 of the motor vehicle, or an automated deceleration is brought about in the longitudinal direction of the vehicle by an actuating intervention at the drive train 20 and/or a brake system 21 of the motor vehicle.

The method illustrated in FIG. 1 subsequently returns to step 2.

FIG. 2a shows a longitudinal speed time/diagram. FIG. 2b shows a longitudinal acceleration/time diagram 23. FIG. 2c shows a jerk/time diagram 24 for the execution of the method 1 illustrated in FIG. 1. In all three FIGS. 2a-2c the abscissa represents the time. In the longitudinal speed/time diagram FIG. 2a, the ordinate represents the speed of the motor vehicle in m/s. In the longitudinal acceleration/time diagram FIG. 2b, the ordinate represents the acceleration of the motor vehicle in m/s$^2$. In the jerk/time diagram FIG. 2c, the ordinate represents the jerk in m/s$^3$.

In the longitudinal speed/time diagram FIG. 2a, a speed profile 25 of the motor vehicle is shown as an unbroken line, an operating mode profile 26, shown as a dashed line, is plotted. In the case of the operating mode profile 26, a value 0 represents the driving mode 8 illustrated in FIG. 1, and a value 1 represents the deceleration mode 9 illustrated in FIG. 1.

In the longitudinal acceleration/time diagram shown in FIG. 2b, an acceleration profile 27 of the motor vehicle that corresponds to the profile of the acceleration variable 11 is plotted. In the jerk/time diagram shown in FIG. 2c a profile 28 of the jerk value 10 is plotted, while the operating mode profile 26 has the value 0, or the jerk value 17, while the operating mode profile 26 has the value 1, from which the acceleration variable 11, vehicle setpoint longitudinal acceleration is determined. On the basis of the jerk profile 28 it is apparent that the first operating mode jerk absolute value 14 is different from the deceleration operating mode jerk absolute value 6. The second driving operating mode jerk absolute value 15 is not applied in the exemplary embodiment illustrated in FIGS. 2a-2c.

Figure 3:
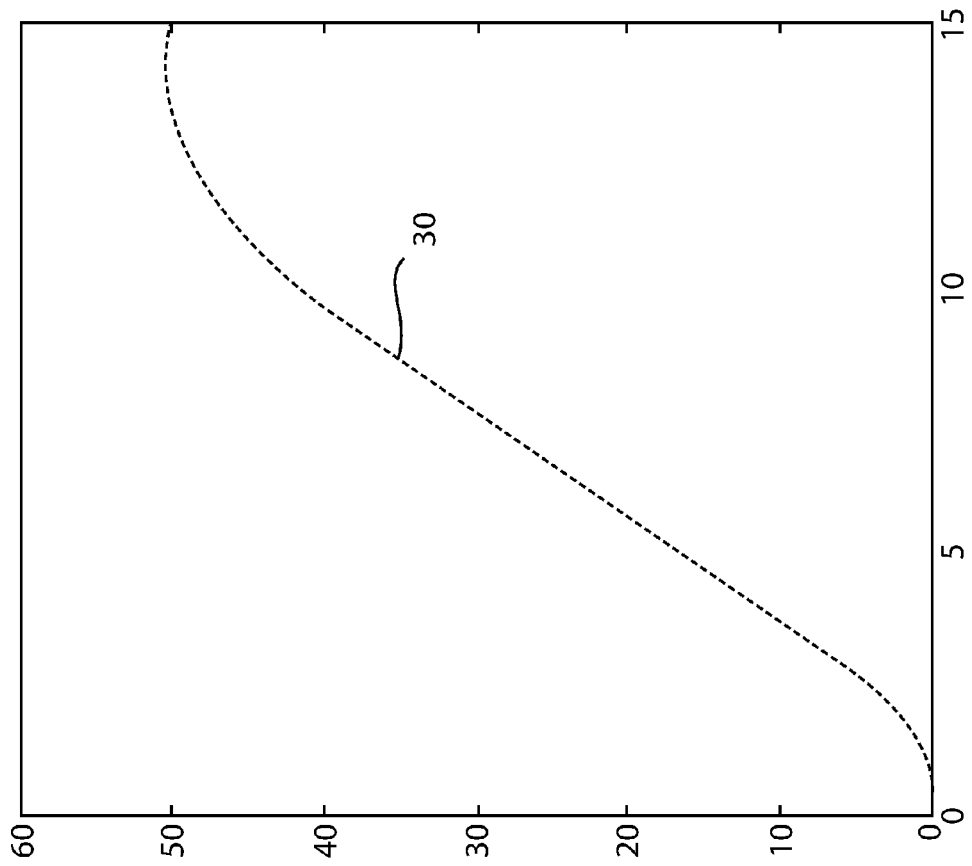
FIG. 3 is a travel/time diagram corresponding to the diagrams of FIGS. 2a-2c.

FIG. 3 shows a travel/time diagram 29 that corresponds to FIGS. 2a-2c and in which a distance profile 30 is plotted. Wherein the abscissa represents the time in seconds, and the ordinate represents in meters the distance covered by the motor vehicle during the automated longitudinal movement control in accordance with the method 1 illustrated in FIG. 1. In FIG. 3 it is apparent that the total distance traveled by the motor vehicle for the execution of the method 1 of FIG. 1, illustrated in FIGS. 2a-2c and 3, is 50 m in this example.

From the FIGS. 2a, 2b, at the start of the automated longitudinal movement control, time equals zero, both the vehicle longitudinal speed 25 and the vehicle longitudinal acceleration 27 each correspond to a value equal to zero. The jerk value 28 associated with the driving mode 8, or operating mode profile 26, equals zero, and correspondingly, in the illustrated case, the jerk value 28 has a value of 3 m/s$^3$. As long as the maximum positive driving mode vehicle longitudinal acceleration 12, which can be predetermined and which corresponds to a value of 2 m/s$^2$ in the case illustrated in FIGS. 2a-2c, has not yet been reached, the jerk 28 is held constantly at the value of 3 m/s$^3$. In this time, the vehicle longitudinal acceleration 27 increases linearly up to the value of 2 m/s$^2$, as is apparent in FIG. 2b.

Subsequently, a jerk 28 with a value zero or zero jerk, in the driving mode 8, results in the vehicle longitudinal acceleration 27 remaining constant for this time period. The transition between the rising edge of the vehicle longitudinal acceleration 27 and the constant profile of the vehicle longitudinal acceleration 27 is soft, owing to the already mentioned low-pass filtering of the jerk 28 and is not abrupt, as would otherwise be the case with a discontinuous profile of the jerk 28 as illustrated in FIG. 2c.

As soon as the vehicle longitudinal speed 25 approaches the predeterminable vehicle longitudinal speed 16 of FIG. 1 to whose value the motor vehicle is adjusted in the driving mode 8, as illustrated in FIG. 2a a value of 5 m/s, the jerk 28 has a negative value for a reduction in the longitudinal acceleration of the motor vehicle, which negative value corresponds in absolute terms to the value of the jerk 28 during the increasing, positive acceleration phase of the motor vehicle. In FIG. 2c it is apparent how the vehicle longitudinal acceleration 27 decreases from its maximum value (2 m/s²) to the value zero in accordance with the determined jerk value 28.

Since the vehicle longitudinal speed 25 has reached its predeterminable vehicle longitudinal speed value 16 of 5 m/s, the jerk value 28 subsequently has a value of zero.

As soon as the distance, still to be traveled by the motor vehicle reaches the total 50 m to be driven in this example, see FIG. 3, becomes shorter than or equal to the braking distance in which, starting from the vehicle actual longitudinal speed 3 and the vehicle actual longitudinal acceleration 4, the motor vehicle can be braked gently and comfortably to the stationary state taking into account the predeterminable maximum deceleration mode vehicle longitudinal deceleration 5 and the predeterminable deceleration mode jerk absolute value 6 illustrated in FIG. 1, the jerk value 28 can determined on the basis of the deceleration mode 9 illustrated in FIG. 1, as is apparent in FIG. 2a from the jump in the operating mode profile 26, wherein the value is equal to one.

In the deceleration mode 9 of the exemplary embodiment of the method 1 illustrated in FIG. 1, the jerk value 28 can be determined on the basis of a relatively small absolute value compared to the driving mode 8, as is apparent in FIG. 2c. The motor vehicle is correspondingly decelerated more slowly to a value of −1 m/s² as can be seen in FIG. 2b. Subsequently, the vehicle longitudinal deceleration is held constantly at this value until the deceleration mode 9 again has a positive jerk value 28 with the same absolute value as the negative jerk value 28 at the start of the deceleration of the motor vehicle. When the 50 m, illustrated in FIG. 3 is reached, the motor vehicle reaches both a vehicle longitudinal acceleration 27 and a vehicle longitudinal speed 25 with the value zero.

The inventive method described above and the inventive device is not limited to the embodiment described herein but rather also comprises identically acting further embodiments.

In a preferred embodiment, the inventive method and the inventive device are used in a motor vehicle for the automated control of the longitudinal movement thereof.

As set forth above, the disclosed exemplary embodiment is a method and device for controlling the longitudinal movement of a motor vehicle, which can accelerate the motor vehicle in a longitudinal direction thereof in an automated fashion, maintain the speed, and gently stop the motor vehicle over a predeterminable distance, with the movement of the motor vehicle being jerk limited, being able to be carried out essentially without a large value of jerk perceived by an occupant of the motor vehicle, and therefore comfortably. The method requires comparatively low computational expenditure for its execution.

The disclosed embodiment provides for automated control of the longitudinal movement of a motor vehicle, in which an automated positive acceleration process in a longitudinal direction of the vehicle is brought about by an actuating intervention at a drive train of the motor vehicle, for example at a drive engine and/or transmission, and an automated deceleration in the longitudinal direction of the vehicle is brought about by means of an actuating intervention at the drive train, for example in engine brake and/or a brake system of the motor vehicle, as a function of an acceleration variable which represents a vehicle setpoint longitudinal acceleration. Drive motors may be internal combustion engines or electric motors, for example.

The acceleration variable is determined based on jerk, which is limited in terms of absolute value and which represents a change over time in the acceleration variable, in that the jerk is integrated, for example, over time. In this context, the jerk can assume either positive or negative values which correspondingly represent a positive change over time in the acceleration variable or a negative change over time in the acceleration variable.

The jerk value is used in either the driving mode in which, starting from a vehicle actual longitudinal speed and a vehicle actual longitudinal acceleration, the motor vehicle is adjusted to a predeterminable vehicle longitudinal speed taking into account a predeterminable maximum positive driving operating mode vehicle longitudinal acceleration, a predeterminable maximum driving operating mode vehicle longitudinal deceleration and at least one predeterminable driving mode jerk absolute value that limits the jerk value, or in the deceleration operating mode in which, starting from the vehicle actual longitudinal speed and the vehicle actual longitudinal acceleration, the motor vehicle is braked to the stationary state within a predeterminable distance, taking into account a predeterminable maximum deceleration mode vehicle longitudinal deceleration and a predeterminable deceleration mode jerk absolute value that limits the jerk value. Braking of the motor vehicle within the predeterminable distance is understood in the sense of the invention as meaning, in particular, gentle, comfortable braking essentially to the stationary state of the motor vehicle or at least until directly before the stationary state of the motor vehicle.

In other words, after braking within a predeterminable distance, the motor vehicle can still have a certain, albeit low, residual longitudinal speed, for example approximately 5 km/h or less, the speed can arise, for example, because the vehicle actual longitudinal acceleration can deviate from the vehicle setpoint longitudinal acceleration determined by the jerk value. The term stationary state is to be understood as referring to a longitudinal movement of the vehicle with a residual longitudinal speed that differs only slightly from an absolute stationary state of the vehicle and which is preferably less than approximately 5 km/h.

It is to be noted that generally any jerk is always to be understood as referring to the change over time in an assigned acceleration variable.

The jerk value in the driving mode starts from the two actual values, vehicle actual longitudinal speed and vehicle actual longitudinal acceleration, made available as a function of a deviation of the vehicle actual longitudinal speed from the predeterminable vehicle longitudinal speed and as a function of a deviation of the vehicle actual longitudinal acceleration from the predeterminable maximum positive driving mode vehicle longitudinal acceleration or from the predeterminable maximum driving operating mode vehicle longitudinal deceleration. The jerk value is assigned, in the simplest case, either a zero value (0), the at least one driving mode jerk absolute value with a negative sign, or the at least one driving mode jerk absolute value with a positive sign, depending on whether the vehicle is accelerated positively or negatively. However, it is also to be understood that intermediate values of the jerk value that lie between these above-mentioned values can also be calculated in the driving mode and assigned to the jerk value in order, for example, to obtain finer gradation of the jerk value in the driving mode.

Using the predeterminable maximum positive driving mode vehicle longitudinal acceleration and the predeterminable maximum driving mode vehicle longitudinal deceleration, comfortable control of the motor vehicle to the predeterminable vehicle longitudinal speed is possible both in the case in which the vehicle actual longitudinal speed is lower than the predeterminable vehicle longitudinal speed and in the case in which the vehicle actual longitudinal speed is higher than the predeterminable vehicle longitudinal speed. In absolute terms, the predeterminable maximum positive driving mode vehicle longitudinal acceleration and the predeterminable maximum driving mode vehicle longitudinal deceleration can be differentiated. For example, a predeterminable maximum positive driving mode vehicle longitudinal acceleration can correspond to a value of 2 m/s², and a predeterminable maximum driving mode vehicle longitudinal deceleration can correspond to a value of −3 m/s².

The jerk value in the deceleration mode also starting from the two actual values, vehicle actual longitudinal speed and vehicle actual longitudinal acceleration, which are made available taking into account the predeterminable maximum deceleration mode vehicle longitudinal deceleration, the jerk is assigned, in the simplest case, either a zero value (0), the deceleration mode jerk absolute value with a negative sign, or the deceleration mode jerk absolute value with a positive sign. However, intermediate values of the jerk value that lie between these above-mentioned variables can also be calculated in the deceleration mode and assigned to the jerk value in order, for example, to obtain finer gradation of the jerk value in the deceleration mode.

As disclosed, automated longitudinal acceleration of the motor vehicle is therefore divided into two parts; the driving mode and the deceleration mode of the motor vehicle, wherein in the driving mode the motor vehicle is controlled, without taking into account a distance, without the need of trajectory planning for a distance, to the predeterminable vehicle longitudinal speed in that said vehicle is correspondingly accelerated or decelerated as a function of the instantaneous vehicle actual longitudinal speed and the instantaneous vehicle actual longitudinal acceleration, and in the deceleration operating mode is braked essentially gently and comfortably to the stationary state within the predeterminable distance.

The division makes this possible without iterative or recursive calculations and therefore requires a significantly smaller expenditure on the computing, since the jerk, necessary in an instantaneous driving situation of the motor vehicle, is determined in each case at the corresponding time on the basis of the given vehicle actual longitudinal speed, the given vehicle actual longitudinal acceleration, the predeterminable maximum positive driving mode vehicle longitudinal acceleration, the predeterminable maximum driving mode vehicle longitudinal deceleration and the predeterminable vehicle longitudinal speed, in the driving mode or on the basis of the given vehicle actual longitudinal speed, the given vehicle actual longitudinal acceleration, the predeterminable maximum deceleration mode vehicle longitudinal deceleration and the predeterminable distance in the deceleration mode. To simplify merely a move of the motor vehicle in the forward direction is taken into account. In addition, the jerk value, limited in terms of absolute value, permits at any time of the driving mode or of the deceleration mode, an essentially jerk-free acceleration of the motor vehicle, which is therefore perceived as comfortable by the occupants of the motor vehicle.

The jerk value in the driving mode, as long as the predeterminable distance is longer than a braking distance in which, starting from the vehicle actual longitudinal speed and the vehicle actual longitudinal acceleration, the motor vehicle can be braked gently and comfortably to the stationary state takes into account the predeterminable maximum deceleration operating mode vehicle longitudinal deceleration and the predeterminable deceleration mode jerk absolute value, and in the deceleration mode if the predeterminable distance is shorter than or equal to the braking distance.

The method changes automatically between the driving mode and the deceleration mode as a function of the predeterminable distance and the braking distance. For example, first the motor vehicle is controlled in the driving mode, the motor vehicle adjusts to the predeterminable vehicle longitudinal speed without taking into account a determined distance, since either there is no obstacle, for example a second motor vehicle traveling ahead or in front of the motor vehicle or the distance from an obstacle is still longer than the braking distance which is necessary for gentle braking of the motor vehicle to the stationary state before the obstacle. If the distance from the obstacle is then equal to or shorter than the braking distance, the motor vehicle is controlled in the deceleration mode, correspondingly braked gently and comfortably. If the obstacle, for example a second motor vehicle traveling ahead, should move further away again during the deceleration process, because the motor vehicle traveling ahead turns off from the lane of the motor vehicle in question or even accelerates again, the method automatically changes again to the driving mode in which the motor vehicle is adjusted gently and comfortably to the predeterminable vehicle longitudinal speed. This procedure corresponds to the natural behavior of a human driver of the motor vehicle and is correspondingly perceived as being consistent and comfortable by the occupants of the motor vehicle. The deceleration mode end automatically as soon as permitted by the external conditions, for example the absence of an obstacle.

The definition of the jerk in the driving mode returns from the definition of the jerk in the deceleration mode only if the predeterminable distance is longer than approximately 100% up to approximately 140% of the braking distance, preferably approximately 110% up to approximately 130% of the braking distance and even more preferably approximately 115% to approximately 125% of the braking distance, for example 120% of the braking distance. This prevents undesired frequent rapid changing between the driving mode and the deceleration mode in the event of an obstacle, for example a second motor vehicle traveling ahead, being at a critical distance in front of the motor vehicle in question, wherein the distance corresponds essentially to the braking distance.

As set forth above, the jerk value in the driving mode is a function of at least seven acceleration zones in combination with, in each case, at least three speed zones. Accordingly, twenty-one possible acceleration speed combinations are defined, on the basis of which the jerk value is, in turn respectively determined, with the result that the vehicle longitudinal control can be effected as comfortably as possible in the driving mode.

The seven acceleration zones are defined as follows, with the first acceleration zone including a vehicle longitudinal acceleration that is above a predeterminable vehicle longitudinal acceleration tolerance range defined about the predeterminable maximum positive driving mode vehicle longitudinal acceleration. The second acceleration zone including a vehicle longitudinal acceleration that lies within the vehicle longitudinal acceleration tolerance range. The third acceleration zone including a vehicle longitudinal acceleration that lies below the vehicle longitudinal acceleration tolerance range and above a predeterminable zero vehicle longitudinal acceleration tolerance range that is defined about a zero vehicle longitudinal acceleration. The zero vehicle longitudinal acceleration represents the value of the vehicle longitudinal acceleration. The fourth acceleration zone including a vehicle longitudinal acceleration that lies within the zero vehicle longitudinal acceleration tolerance range. The fifth acceleration zone including a vehicle longitudinal acceleration that lies below the zero vehicle longitudinal acceleration tolerance range and above a predeterminable vehicle longitudinal deceleration tolerance range which is defined about the predeterminable maximum driving mode vehicle longitudinal deceleration. The sixth acceleration zone including a vehicle longitudinal acceleration that lies within the vehicle longitudinal deceleration tolerance range. The seventh acceleration zone including a vehicle longitudinal acceleration that lies below the vehicle longitudinal deceleration tolerance range.

The three predeterminable tolerance range being the vehicle longitudinal acceleration tolerance range, zero vehicle longitudinal acceleration tolerance range, and vehicle longitudinal deceleration tolerance range. All, in the simplest case, have the same tolerance width. However, they can also have different individual tolerance widths.

The three speed zones are defined as a first speed zone including a vehicle longitudinal speed that lies above a predeterminable speed tolerance range that is defined about the predeterminable vehicle longitudinal speed. The second speed zone includes a vehicle longitudinal speed that lies within the speed tolerance range. The third speed zone includes a vehicle longitudinal speed that lies below the speed tolerance range.

Additionally, the jerk value may in the driving mode take into account two predeterminable driving mode jerk absolute values that limit the jerk. In this way, for example a jerk that is relatively large in terms of absolute value can be determined insofar as the deviations of the vehicle actual longitudinal acceleration and/or of the vehicle actual longitudinal speed from the predeterminable maximum positive driving mode vehicle longitudinal acceleration, the predeterminable maximum driving mode vehicle longitudinal deceleration, or the predeterminable vehicle longitudinal speed is outside predeterminable tolerance ranges, with the result that adaptation of the vehicle longitudinal speed to the predeterminable vehicle longitudinal speed can take place more quickly and nevertheless comfortably. For example, a value of approximately 3 m/s$^3$ can be defined as a relatively small jerk in terms of absolute value, and a value of approximately 10 m/s$^3$ can be defined as a relatively large jerk in terms of absolute value.

The jerk value in the driving mode can vary in terms of absolute value from the jerk value in the deceleration mode. Therefore, the jerk value in the deceleration mode can, for example, be smaller in terms of absolute value than the jerk value in the driving mode, in order to achieve a gentler and therefore more comfortable deceleration during the deceleration mode. For example, the jerk value determined on the basis of the deceleration mode can correspond in terms of absolute value to a value of approximately 1 m/s$^3$.

Further, the jerk value in the deceleration mode may be a function of four deceleration time periods. In this context, the first time period represents a duration for decelerating from a positive vehicle actual longitudinal acceleration to a zero vehicle longitudinal acceleration, a vehicle longitudinal acceleration of the value zero (0). The second time period represents a duration for reaching a maximum vehicle longitudinal deceleration, a vehicle longitudinal acceleration with a negative value, which corresponds either to the predeterminable maximum deceleration mode vehicle longitudinal deceleration or a vehicle longitudinal deceleration that is lower in terms of absolute value, if the predeterminable maximum deceleration mode vehicle longitudinal deceleration does not have to be reached all in the second time period to brake the motor vehicle to the stationary state within the predeterminable distance. The third time period represents a duration during which the predeterminable maximum deceleration mode vehicle longitudinal deceleration is kept constant insofar as it has been reached in the second time period. The fourth time period represents a duration for ending the deceleration starting from the maximum vehicle longitudinal deceleration reached in the second time period. The jerk value is then determined as being unequal to zero with respect to the sequence from the first to the fourth time period on the basis of the first duration.

The deceleration mode calculates a trapezoidal or wedge-shaped profile for the vehicle longitudinal deceleration necessary during the stopping process of the motor vehicle within the predeterminable distance, on the basis of which the jerk value is in turn based, as described above. The trapezoidal or wedge-shaped profile of the vehicle longitudinal deceleration results in a deceleration trajectory of the motor vehicle that is easy to calculate, can be calculated non-iteratively and non-recursively and describes the deceleration distance of the motor vehicle for gentle and comfortable stopping of the motor vehicle starting from the vehicle actual longitudinal speed and the vehicle actual longitudinal deceleration taking into account the predeterminable maximum deceleration mode vehicle longitudinal deceleration and the predeterminable deceleration mode jerk absolute value.

In addition, the jerk value is subjected to low-pass filtering before the determination of the acceleration variable. In the case of discontinuous or sudden changes in the jerk value, the transitions in the profile of the acceleration variable at the sudden changes of the jerk value take place more gently and more softly. This means that the actuating movement at the drive train and/or at the brake system of the motor vehicle, which corresponds to the acceleration variable, starts and ends more slowly, and can in turn improve the NVH (noise, vibration, harshness) properties of the motor vehicle. As a sudden change in the acceleration variable can bring about an undesired generation of noise owing to play between the components, for example on the brake system. For example, the jerk value can be averaged over a time period of approximately 100 ms for the purpose of the low-pass filtering.

An electronic control device for the automated control of the longitudinal movement of a motor vehicle is also disclosed. The control device configured to bring about an automated acceleration process in a vehicle longitudinal direction by an actuating intervention at a drive train of the motor vehicle as a function of an acceleration variable that represents a vehicle setpoint longitudinal acceleration and to bring about an automated deceleration in the longitudinal direction of the vehicle by an actuating intervention at the drive train and/or a brake system of the motor vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for automated control of the longitudinal movement of a motor vehicle comprising:
controlling an automated vehicle acceleration in a longitudinal direction of the vehicle by actuating a drive train of the motor vehicle;

controlling an automated vehicle deceleration in the longitudinal direction of the vehicle by actuating one of a drive train and a brake system of the motor vehicle;

determining an acceleration variable representing a vehicle setpoint longitudinal acceleration, wherein the acceleration variable is determined from a jerk value, said jerk value limited in terms of an absolute value and representing a change over time in the acceleration variable;

said jerk value determined either in a driving mode, starting from a vehicle actual longitudinal speed and a vehicle actual longitudinal acceleration, wherein the motor vehicle is adjusted to a predeterminable vehicle longitudinal speed based on a predeterminable maximum positive driving mode vehicle longitudinal acceleration, a predeterminable maximum driving mode vehicle longitudinal deceleration, and at least one predeterminable driving mode jerk absolute value that limits the jerk value; or in a deceleration mode, starting from the vehicle actual longitudinal speed and the vehicle actual longitudinal acceleration, wherein the motor vehicle is braked to a stationary state within a predeterminable distance, based on a predeterminable maximum deceleration mode vehicle longitudinal deceleration and a predeterminable deceleration mode jerk absolute value that limits the jerk value; and wherein the jerk value in the driving mode is a function of at least seven acceleration zones in combination and at least three speed zones, wherein the first acceleration zone comprises a vehicle longitudinal acceleration which is above a predeterminable vehicle longitudinal acceleration tolerance range which is defined about the predeterminable maximum positive driving operating mode vehicle longitudinal acceleration, the second acceleration zone comprises a vehicle longitudinal acceleration which lies within the vehicle longitudinal acceleration tolerance range, the third acceleration zone comprises a vehicle longitudinal acceleration which lies below the vehicle longitudinal acceleration tolerance range, and above a predeterminable zero vehicle longitudinal acceleration tolerance range which is defined about a zero vehicle longitudinal acceleration, the fourth acceleration zone comprises a vehicle longitudinal acceleration which lies within the zero vehicle longitudinal acceleration tolerance range, the fifth acceleration zone comprises a vehicle longitudinal acceleration which lies below the zero vehicle longitudinal acceleration tolerance range and above a predeterminable vehicle longitudinal deceleration tolerance range which is defined about the predeterminable maximum driving mode vehicle longitudinal deceleration, the sixth acceleration zone comprises a vehicle longitudinal acceleration which lies within the vehicle longitudinal deceleration tolerance range, and the seventh acceleration zone comprises a vehicle longitudinal acceleration which lies below the vehicle longitudinal deceleration tolerance range, wherein the first speed zone comprises a vehicle longitudinal speed which lies above a predeterminable speed tolerance range which is defined about the predeterminable vehicle longitudinal speed, the second speed zone comprises a vehicle longitudinal speed which lies within the speed tolerance range, and the third speed zone comprises a vehicle longitudinal speed which lies below the speed tolerance range.

2. The method of claim 1 wherein the jerk value is based on the driving mode as long as the predeterminable distance is longer than a braking distance in which, starting from the vehicle actual longitudinal speed and the vehicle actual longitudinal acceleration, the motor vehicle can be braked to the stationary state based on the predeterminable maximum deceleration mode vehicle longitudinal deceleration, the predeterminable deceleration mode jerk absolute value, and the jerk value based on the deceleration mode if the predeterminable distance is shorter than or equal to the braking distance.

3. The method of claim 2 wherein the jerk value returns to a jerk value based on the driving mode from the jerk value based on the deceleration mode only if the predeterminable distance is longer than approximately 100% up to approximately 140% of the braking distance, preferably approximately 110% up to approximately 130% of the braking distance and more preferably approximately 115% to approximately 125% of the braking distance.

4. The method of claim 1 wherein the jerk value is subjected to low-pass filtering before determination of the acceleration variable.

5. A method for automated control of the longitudinal movement of a motor vehicle comprising:

controlling an automated vehicle acceleration in a longitudinal direction of the vehicle by actuating a drive train of the motor vehicle;

controlling an automated vehicle deceleration in the longitudinal direction of the vehicle by actuating one of a drive train and a brake system of the motor vehicle;

determining an acceleration variable representing a vehicle setpoint longitudinal acceleration, wherein the acceleration variable is determined from a jerk value, said jerk value limited in terms of an absolute value and representing a change over time in the acceleration variable;

said jerk value determined either in a driving mode, starting from a vehicle actual longitudinal speed and a vehicle actual longitudinal acceleration, wherein the motor vehicle is adjusted to a predeterminable vehicle longitudinal speed based on a predeterminable maximum positive driving mode vehicle longitudinal acceleration, a predeterminable maximum driving mode vehicle longitudinal deceleration, and at least one predeterminable driving mode jerk absolute value that limits the jerk value; or in a deceleration mode, starting from the vehicle actual longitudinal speed and the vehicle actual longitudinal acceleration, wherein the motor vehicle is braked to a stationary state within a predeterminable distance, based on a predeterminable maximum deceleration mode vehicle longitudinal deceleration and a predeterminable deceleration mode jerk absolute value that limits the jerk value; and wherein the jerk value in the deceleration operating mode is a function of four deceleration time periods, wherein the first time period represents a duration for decelerating from a positive vehicle actual longitudinal acceleration to a zero vehicle longitudinal acceleration, the second time period represents a duration for reaching a maximum vehicle longitudinal deceleration which corresponds either to the predeterminable maximum deceleration mode vehicle longitudinal deceleration or a vehicle longitudinal deceleration which is lower in terms of absolute value, if the predeterminable maximum deceleration mode vehicle longitudinal deceleration does not have to be reached in the second time period in order to brake the motor vehicle to the stationary state within the predeterminable distance, the third time period represents a duration during which the predeterminable maximum deceleration mode vehicle longitudinal deceleration is kept constant insofar as it has been reached in the second time period, and the fourth time period represents a duration for ending the deceleration starting from the maximum vehicle longitudinal deceleration reached in the second time period, wherein the jerk value is defined based on the first non zero time duration in the sequence from the first to the fourth time period.

* * * * *